US012786967B2

(12) United States Patent
Li et al.

(10) Patent No.: US 12,786,967 B2
(45) Date of Patent: Nov. 3, 2026

(54) TERMINAL APPARATUS THAT EXECUTES FLEXIBLE OPERATIONAL PROCEDURE OF COMPONENT CARRIERS, AND BASE STATION APPARATUS, CONTROL METHOD

(71) Applicant: KDDI CORPORATION, Tokyo (JP)

(72) Inventors: Yanwei Li, Tokyo (JP); Hiroki Takeda, Tokyo (JP); Yasuki Suzuki, Tokyo (JP); Shingo Watanabe, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 317 days.

(21) Appl. No.: 18/435,639

(22) Filed: Feb. 7, 2024

(65) Prior Publication Data

US 2024/0179694 A1 May 30, 2024

Related U.S. Application Data

(63) Continuation of application No. PCT/JP2022/025816, filed on Jun. 28, 2022.

(30) Foreign Application Priority Data

Nov. 26, 2021 (JP) ................................ 2021-192405

(51) Int. Cl.
*H04W 72/0453* (2023.01)
*H04L 5/00* (2006.01)
*H04W 72/231* (2023.01)

(52) U.S. Cl.
CPC ......... *H04W 72/0453* (2013.01); *H04L 5/001* (2013.01); *H04L 5/0098* (2013.01); *H04W 72/231* (2023.01)

(58) Field of Classification Search
CPC ........................ H04W 72/0453; H04W 72/231
See application file for complete search history.

(56) References Cited

U.S. PATENT DOCUMENTS

2012/0250578 A1* 10/2012 Pani ..................... H04W 48/12 370/254
2015/0156690 A1 6/2015 Futaki
2016/0337893 A1* 11/2016 Gheorghiu .............. H04L 5/001

FOREIGN PATENT DOCUMENTS

JP 2019-092046 A 6/2019
JP 2021-029025 A 2/2021
(Continued)

OTHER PUBLICATIONS

"CA Signaling Enhancements for HetNet Type Deployments", 3GPP Draft; R2-120266 CA Signaling Enhancements for Hetnet Type Deployments, 3rd Generation Partnership Project (3GPP), vol. RAN WG2, No. Dresden, Germany; Feb. 6, 2012-Feb. 1, 2012, Jan. 31, 2012 (Jan. 31, 2012), XP050565352 . (Year: 2012).*
(Continued)

*Primary Examiner* — Myron Wyche
(74) *Attorney, Agent, or Firm* — Foley & Lardner LLP

(57) ABSTRACT

A terminal apparatus notifies a base station apparatus of information indicating a combination of frequency bands usable by the terminal apparatus in a case of communicating using a plurality of component carriers with different frequency bands, and obtains, from the base station apparatus, information of a setting for using one or more component carriers corresponding to one or more frequency bands unrestricted by the combination of usable frequency bands.

14 Claims, 5 Drawing Sheets

(56) References Cited

FOREIGN PATENT DOCUMENTS

| | | | | |
|---|---|---|---|---|
| WO | WO-2010/126107 A1 | | 11/2010 | |
| WO | WO-2014/007336 A1 | | 1/2014 | |
| WO | WO-2016/117985 A1 | | 7/2016 | |
| WO | WO20216/117985 | * | 7/2016 | ............ H04W 24/10 |

OTHER PUBLICATIONS

3GPP TS38.331 V16.6.0 (Sep. 2021), 3rd Generation Partnership Project; Technical Specification Group Radio Access Network; NR; Radio Resource Control (RRC) protocol specification (Release 16); 961 pages.

Extended European Search Report concerning the corresponding European Patent Application No. 22898161.9 dated Feb. 18, 2025 (9 pages).

Intel Corporation: "Ca Signaling Enhancements for HetNet Type Deployments," 3GPP Draft; R2-120266 Ca Signaling Enhancements for Hetnet Type Deployments, 3rd Generation Partnership Project (3GPP), Mobile Competence Centre; 650, Route Des Lucioles; F-06921 Sophia-Antipolis Cedex; France, vol. RAN WG2, No. Dresden, Germany; Feb. 6, 2012-Feb. 10, 2012, Jan. 31, 2012 [retrieved on Jan. 31, 2012] (3 pages).

* cited by examiner

FIG. 1

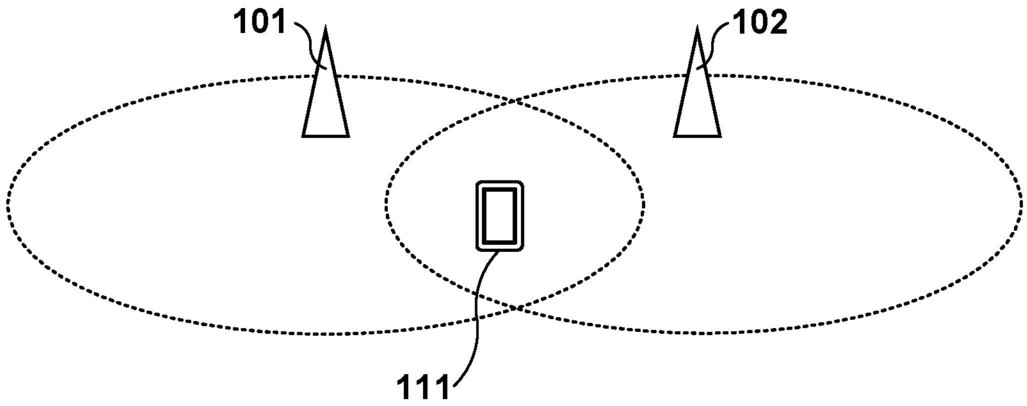

FIG. 2

| INDEX | Primary CC | Secondary CC | | | |
|---|---|---|---|---|---|
| | Band 1 | Band 18, PCI=1 | Band 18, PCI=2 | Band 41 | Band 42 |
| 0 | **Activated** | Deactivated | Deactivated | Deactivated | Deactivated |
| 1 | **Activated** | **Activated** | Deactivated | Deactivated | Deactivated |
| 2 | **Activated** | Deactivated | **Activated** | Deactivated | Deactivated |
| 3 | **Activated** | Deactivated | Deactivated | **Activated** | Deactivated |
| 4 | **Activated** | Deactivated | Deactivated | Deactivated | **Activated** |

FIG. 3

| INDEX | Primary CC | Secondary CC | | | |
|---|---|---|---|---|---|
| | Band 1 | Band 18, PCI=1 | Band 18, PCI=2 | Band 41 | Band 42 |
| 0 | **Activated** | Deactivated | Deactivated | Deactivated | Deactivated |
| 1 | **Activated** | **Activated** | Deactivated | Deactivated | Deactivated |
| 2 | **Activated** | Deactivated | **Activated** | Deactivated | Deactivated |
| 3 | **Activated** | Deactivated | Deactivated | **Activated** | Deactivated |
| 4 | **Activated** | Deactivated | Deactivated | Deactivated | **Activated** |
| 5 | Deactivated | **Activated** | Deactivated | Deactivated | Deactivated |
| 6 | Deactivated | Deactivated | **Activated** | Deactivated | Deactivated |
| 7 | Deactivated | Deactivated | Deactivated | **Activated** | Deactivated |
| 8 | Deactivated | Deactivated | Deactivated | Deactivated | **Activated** |
| 9 | Deactivated | **Activated** | Deactivated | **Activated** | Deactivated |
| 10 | Deactivated | Deactivated | **Activated** | **Activated** | Deactivated |
| 11 | Deactivated | Deactivated | Deactivated | **Activated** | **Activated** |

TERMINAL APPARATUS THAT EXECUTES FLEXIBLE OPERATIONAL PROCEDURE OF COMPONENT CARRIERS, AND BASE STATION APPARATUS, CONTROL METHOD

CROSS-REFERENCE TO RELATED APPLICATION(S)

This application is a continuation of International Patent Application No. PCT/JP2022/025816 filed on Jun. 28, 2022, which claims priority to and the benefit of Japanese Patent Application No. 2021-192405 filed on Nov. 26, 2021, the entire disclosures of which are incorporated herein by reference.

BACKGROUND OF THE INVENTION

Field of the Invention

The present invention relates to a flexible usage control technique for component carriers.

Description of the Related Art

In the cellular communication standard of the 3rd Generation Partnership Project (3GPP), dual connectivity (DC) and carrier aggregation (CA) that can simultaneously use a plurality of component carriers (CC) with a terminal apparatus are specified. With DC or CA, on the basis of the capability of the terminal apparatus (UE capability), the plurality of CCs that can be simultaneously used with the terminal apparatus are set. The plurality of CCs include a primary CC and a secondary CC. When the terminal apparatus performs communication, for the secondary CC of the CCs set for the terminal apparatus, activation and deactivation are performed. This allows whether or not the secondary CC is actually used to be set.

In a case where CCs with a plurality of different frequency bands are prepared, as the capability of the terminal apparatus, a combination of usable frequency bands is specified. Thus, a combination of CCs of usable frequency bands are set for the terminal apparatus. However, in some cases, the wireless quality of a second frequency band different from a first frequency band of the CCs used by the terminal apparatus may become better than the wireless quality of the first frequency band. Depending on the capability of the terminal apparatus, it is expected that a first CC used by the terminal apparatus and a second CC with a frequency band with better wireless quality cannot be simultaneously used. In this case, in order to switch the CC used by the terminal apparatus from the first CC to the second CC, the second CC needs to be set after the setting of the first CC is canceled, making the processing complicated.

SUMMARY OF THE INVENTION

The present invention provides a technique for enabling the switching of component carriers used by a terminal apparatus to be easily performed.

A terminal apparatus according to one aspect of the present invention comprises one or more processors; and one or more memories that store a computer-readable instruction for causing, when executed by the one or more processors, the one or more processors to function as: a notifying unit configured to notify a base station apparatus of information indicating a combination of frequency bands usable by the terminal apparatus in a case of communicating using a plurality of component carriers with different frequency bands; and an obtaining unit configured to obtain, from the base station apparatus, information of a setting for using one or more component carriers corresponding to one or more frequency bands unrestricted by the combination of usable frequency bands.

A base station apparatus according to one aspect of the present invention comprises one or more processors; and one or more memories that store a computer-readable instruction for causing, when executed by the one or more processors, the one or more processors to function as: a notifying unit configured to notify a terminal apparatus of information of a setting for using one or more component carriers corresponding to one or more frequency bands unrestricted by a combination of usable frequency bands in a case of the terminal apparatus communicating using a plurality of component carriers with different frequency bands; and an obtaining unit configured to obtain information indicating, from among the set one or more component carriers, a component carrier to be activated on a basis of the combination of frequency bands usable by the terminal apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 1 is a diagram illustrating an example of the configuration of a wireless communication system.

FIG. 2 is a diagram for describing an example of a method for designating CCs to be activated/deactivated.

FIG. 3 is a diagram for describing an example of a method for designating CCs to be activated/deactivated.

DESCRIPTION OF THE EMBODIMENTS

Figure 4:
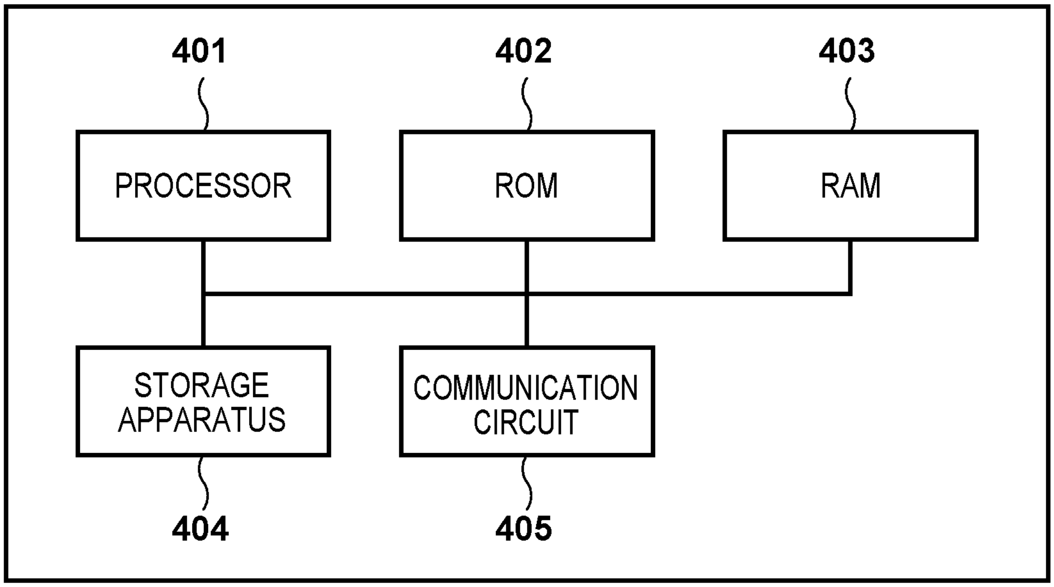
FIG. 4 is a diagram illustrating an example of the hardware configuration of an apparatus.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

System Configuration

FIG. 1 illustrates an example of the configuration of a wireless communication system according to the present embodiment. The present wireless communication system uses a long-term evolution (LTE) or fifth-generation (5G) cellular communication standard and includes a base station apparatus 101, a base station apparatus 102, and a terminal apparatus 111. Note that in herein, a small number of base station apparatuses and terminal apparatuses are illustrated to simplify the description, but naturally multiple base station apparatuses and terminal apparatuses may exist.

In the present embodiment, the terminal apparatus 111 is configured to perform communication with the base station apparatus 101 or the base station apparatus 102 using a plurality of component carriers (CCs) simultaneously and in parallel using dual connectivity (DC) or carrier aggregation (CA). Note that "CC" used hereinafter can be substituted with "cell". The plurality of CCs may be configured with the same frequency band, but in the present embodiment, communication is performed using a plurality of CCs corresponding to different frequency bands. In the present embodiment, the terminal apparatus 111 is configured to be able to use only a combination of two or more frequency bands and cannot use all of the combinations of the different frequency bands. For example, the terminal apparatus 111 can use a combination of a first frequency band and a second frequency band and a combination of the first frequency band and a third frequency band but cannot use a combination of the second frequency band and the third frequency band and a combination of the first frequency band, the second frequency band, and the third frequency band. Note that the first frequency band, the second frequency band, and the third frequency band may be specified as band 1, band 18, and band 41 in the standard, for example. Also, three frequency bands are described herein, but another frequency band such as a fourth frequency band (for example, band 42) may be prepared.

In this case, for example, the base station apparatus 101, while connected to the terminal apparatus 111 using the first frequency band, uses the CC of the first frequency band as the primary component carrier (primary CC) or the primary cell and sets the CC of the second frequency band or the third frequency band as the secondary component carrier (secondary CC) or the secondary cell. Note that in the following description, the base station apparatus that provides communication using the primary CC is the base station apparatus 101, but the base station apparatus 102 may operate and perform this function, and the base station apparatus 101 in the following description may be substituted with the base station apparatus 102. Also, the primary CC and the secondary CC may both be configured as LTE CCs, or the primary CC and the secondary CC may both be configured as 5G CCs. In other words, the primary CC and the secondary CC may both be configured as CCs of the same wireless system. Also, the primary CC may be configured as an LTE CC and the secondary CC may be configured as a 5G CC, or the primary CC may be configured as a 5G CC and the secondary CC may be configured as a CC of LTE or a CC defined by the next generation. In other words, the primary CC and the secondary CC may be configured as CCs of different wireless systems.

The base station apparatus 101, for example, performs add setting for CCs to set the CC of the second frequency band as the secondary CC using an RRC (radio resource control) message for the terminal apparatus 111. Typically, the add setting is performed in accordance with the capability information (UE capability) of the terminal apparatus 111. In other words, with a known technique, the add setting for CCs can be used for only frequency bands of a combination that the terminal apparatus 111 can use. Then, after this setting is complete, the terminal apparatus 111 may execute a random access procedure and establish a connection with the base station apparatus (for example, the base station apparatus 101 or the base station apparatus 102) providing the secondary CC and may start communicating using the secondary CC. Note that after the add setting for the secondary CC, the terminal apparatus 111 can activate (activation) the CC to communicate using the secondary CC. Also, for example, in a case where the necessary throughput is reduced, the secondary CC may be made to be not used. In this case, the CC can be deactivated (deactivation). Here, in a case where the terminal apparatus 111 can use all of the first frequency band, the second frequency band, and the third frequency band, setting to add a secondary CC can be performed for both the second frequency band and the third frequency band while the CC of the first frequency band is made the primary CC. In this case, if the wireless quality of the second frequency band deteriorates and the wireless quality of the third frequency band improves while the CC of the second frequency band is set as the secondary CC, the terminal apparatus 111 can deactivate the CC of the second frequency band and activate the CC of the third frequency band to selectively use the CC of the frequency band with good wireless quality.

On the other hand, as described above, in the present embodiment, the terminal apparatus 111 can use a combination of the first frequency band and the second frequency band and a combination of the first frequency band and the third frequency band but cannot use a combination of the second frequency band and the third frequency band and a combination of the first frequency band, the second frequency band, and the third frequency band. Thus, in a case where, while the terminal apparatus 111 is communicating using the CC of the first frequency band and the CC of the second frequency band, the wireless quality of the CC of the second frequency band deteriorates to a state where the CC of the third frequency band should be switched to, this switch cannot be performed via activation and deactivation. In other words, in this case, for example, unless the base station apparatus 101 cancels the setting of the CC of the second frequency band and performs setting of the CC of the third frequency band, the terminal apparatus 111 cannot use the CC of the third frequency band. Also, this setting may increase the processing complexity or the signaling overhead due to the transmission and reception of RRC messages or may increase the amount of time taken to complete the CC setting change.

In the present embodiment, in consideration of this situation, the terminal apparatus 111 notifies the base station apparatus 101 of its capability information (UE capability). As described above, in the present embodiment, the terminal apparatus 111 notifies the base station apparatus 101 of information of its capability indicating that it can use a combination of the first frequency band and the second frequency band and a combination of the first frequency band and the third frequency band. Note that this capability information does not include a combination of the second frequency band and the third frequency band and a combination for the first frequency band, the second frequency band, and the third frequency band. In other words, the combinations of the frequency bands not included in the capability information are implicitly indicated as combinations that cannot be used by the terminal apparatus 111. Without being restricted or bound by the combinations of frequency bands that the terminal apparatus 111 can use, the base station apparatus 101 executes setting processing to make one or more CCs corresponding to one or more frequency bands usable by the terminal apparatus 111. As described above, the terminal apparatus 111 cannot use the combination of the first frequency band, the second frequency band, and the third frequency band, but the base station apparatus 101 performs setting for making the CC of the first frequency band it's providing able to be used as the primary CC and the CC of the second frequency band and the third frequency band able to be used as the secondary CC. In other words, typically, the base station apparatus 101 can only set the second frequency band or the third frequency band as the secondary CC, but in the present embodiment, both the second frequency band and the third frequency band can be set. Note that, for example, the base station apparatus 101 may perform setting for one or more or all of the frequency bands able to be used by the terminal apparatus 111 indicated by the capability information of the terminal apparatus 111.

For example, in a case where another base station apparatus exists that provides communication using the second frequency band or communication using the third frequency band, the base station apparatus 101 transmits a request to the base station apparatus to add a secondary CC (secondary cell) and receives the response. Thereafter, the base station apparatus 101 transmits an RRC message (for example, an RRC reconfiguration message) to the terminal apparatus 111 and receives a response message (for example, an RRC reconfiguration complete message) from the terminal apparatus 111 to complete the setting for the terminal apparatus 111. The terminal apparatus 111 obtains setting information for using the CC of the second frequency band and the CC of the third frequency band and performs setting based on this setting information. By activating the CC set in this manner, the terminal apparatus 111 can use the CC. Note that at this time, the terminal apparatus 111 selects the activated CC on the basis of its capability information. In other words, in the present embodiment, the base station apparatus 101 performs setting of a CC candidate on the basis of the capability information of the terminal apparatus 111 and provides setting information relating to setting for the terminal apparatus 111. Then, the terminal apparatus 111 performs setting for using the CC candidate on the basis of the setting information and activates or deactivates one of the CC candidates as necessary. Note that the base station apparatus 101, for example, may use an RRC message for setting the CC candidate described above to instruct as to which CC to initially activate. Note that initially, all of the CC candidates may be deactivated. Note that "deactivated" means a state which can be made a state in which CC can be used by activation processing being executed and a state which does not allow communication to be performed but a state for which setting is complete.

According to such a procedure, the terminal apparatus 111 can switch the CC to use via CC activation or deactivation. Accordingly, since it is not necessary to repeatedly perform transmitting and receiving of an RRC message to switch the CC, the setting processing can be simplified, an increase in signaling overhead can be prevented, and the time taken for switching CC can be reduced. Note that CC activation and deactivation may be performed via an instruction from the base station apparatus 101, and in this case, it may be performed via a message different from an RRC message such as downlink control information (DCI), for example. For example, the base station apparatus 101 may notify the terminal apparatus 111 of information indicating whether to set an activated state or a deactivated state for each of the secondary CC candidates. For example, the base station apparatus 101 may notify the terminal apparatus 111 of a bitmap with a number of bits of only the number of secondary CC candidates with "1" assigned to the secondary CC candidates to be activated and "0" assigned to the secondary CC candidates to be deactivated. Also, the base station apparatus 101 may include an information element for designating a state indicating whether or not to initially activate in the setting information for each candidate in an RRC message when setting each secondary CC candidate, for example. By using an information element such as "scellstate" and designating "scellstate=activated" in the case of activation and "scellstate=deactivated" in the case of deactivation, for example, the base station apparatus 101 can initially designate whether to activate or deactivate each CC candidate. However, this is just an example, and in another configuration, the primary CC can also be set to be deactivated. In this case, for example, only the secondary CC may be activated and used for communication.

Note that the base station apparatus 101, for example, may notify the terminal apparatus 111 of the number of secondary CCs that can be activated. For example, the base station apparatus 101 may set the number depending on how congested the network is, how much data the terminal apparatus 111 needs to transmit and received, and the like. For example, in the case of increasing the amount of transmission data of the network or the terminal apparatus 111, the number of CCs that can be simultaneously activated in the terminal apparatus 111 can be increased, and in the case of decreasing the amount of transmission data of the network or the terminal apparatus 111, the number of CCs that can be simultaneously activated in the terminal apparatus 111 can be decreased. Also, for example, when the network is in a congested state, the base station apparatus 101 may set the number of secondary CCs to a low number, and when the network is in a non-congested state, the base station apparatus 101 may set the number of secondary CCs to a high number.

Note that, for example, in a case where a number greater than the number of CCs that the terminal apparatus 111 can activate is designated, the number is not set, or the number is set to a predetermined number, the terminal apparatus 111 may determine to perform setting according to typical processing. In this case, when the terminal apparatus 111 receives the setting information of a CC of a frequency band of a combination that it cannot use, the terminal apparatus 111 may discard the setting information. Also, the terminal apparatus 111 may notify the base station apparatus 101 of the number of CCs that can be simultaneously activate as the capability information. In this case, the base station apparatus 101 may notify the terminal apparatus 111 of a number not greater than this number as the number of secondary CCs that can be activated. Also, the base station apparatus 101 may notify the terminal apparatus 111 of at least information indicating a combination of frequency bands that cannot be activated together or information indicating a combination of frequency bands that can be activated together. For example, in a case where two or more of the frequency bands should not be used temporarily or the like, the terminal apparatus 111 may be notified that a combination including these frequency bands should not be used. Note that the notification of the number of secondary CCs that can be activated or a combination of frequency bands that can be activated together may be performed via an RRC message or may be performed via a message different from an RRC message such as a DCI or the like. Also, a plurality of terminal apparatuses may be notified all together of the information of the number of CCs that can be activated or a combination of frequency bands that can be activated together via notification information (for example, a system information block).

Note that in the example described above, one CC (cell) is set for one frequency band. However, a plurality of CCs (cells) may be associated with one frequency band. In this case, the CCs are designated by a cell identifier (for example, physical cell identity (PCI), cell group identity (CGI), or the like), and the CC setting and activation/deactivation are performed as in the processing example described above. Note that for each of the secondary CCs (cells) may be assigned a temporary serial number (index) which is used to designate activation/deactivation for each CC. For example, the index "0" is assigned to a CC corresponding to a first cell identifier of the band 18, the index "1" is assigned to a CC corresponding to a second cell identifier of the band 18, and the index "2" is assigned to a CC of the band 41, and the index "3" is assigned to a CC of the band 42, and activation and deactivation of each CC may be performed via an instruction from the base station apparatus 101 via information designating a CC using an index. For example, in a case where four CCs are set as described above, activation and deactivation of each CC may be performed via an instruction using a 4-bit bitmap corresponding to each index 0 to 3. Alternatively, an index may be assigned to a combination of activation/deactivation of each one of the plurality of CCs, and activation/deactivation of each CC may be designated by designating these indexes. An example of a designation method is illustrated in FIG. 2. As illustrated in FIG. 2, for example, a case where all of the secondary CCs are not used is designated with the index "0", a case where the secondary CC of band 18 and PCI=1 is activated is designated with the index "1", a case where the secondary CC of band 41 is activated is designated with the index "3", and the like.

Note that in the example described above, the primary CC is always activated, but the primary CC may be deactivated. In this case, the primary CC may be activated/deactivated in a similar manner to how the secondary CCs are activated/deactivated as described above. For example, in the case of using a method of assigning indexes to combinations of activation/deactivation of each one of the CCs, as illustrated in FIG. 3, an index is also assigned to a CC use pattern in the case of a deactivated primary CC. In the case of using a bitmap, it is sufficient that one bit of the primary CC is added. Note that here, band 1 is referred to as the primary CC and deactivating band 1 is referred to as deactivating the primary CC. However, any of the activated CCs may be selected as the primary CC. In other words, a plurality of CC candidates may be set in advance, and processing may be performed to select the primary CC from among the candidates.

Note that when CC candidates are set in advance, the setting used when selected as a primary CC and the setting used when selected as a secondary CC may be separately set. In this case, the terminal apparatus 111 may switch the setting of the CC depending on with it is selected as a primary CC or a secondary CC.

Note that the terminal apparatus 111 may notify of a measurement result of the wireless quality for each frequency band so that the base station apparatus 101 can perform CC setting or decide activation/deactivation. For the notification, a mechanism (for example, a MEASUREMENT REPORT) such as a known measurement report may be used, or a new notification mechanism (for example, UE ASSISTANCE INFORMATION) may be prepared. The base station apparatus 101, on the basis of this notification, may decide whether to perform at least one of activate one or more of the CCs or deactivate one or more of the CCs and notify the terminal apparatus 111 of this. Also, the terminal apparatus 111 may independently perform CC activation or deactivation and notify the base station apparatus 101 of information indicating at least one of one or more of the CCs have been activated or one or more of the CCs have been deactivated. This notification may be performed using a bitmap or the indexes illustrated in FIGS. 2 and 3 as described above, for example. Also, this notification may be reported using uplink control information (UCI). Rank may be used, and this notification may be performed by transmitting information multiplexed with user data to be transmitted on the primary CC, for example. Also, the transmitting and receiving of information between the terminal apparatus 111 and the base station apparatus 101 (uplink and downlink) as described above may be performed using MAC (medium access control) CE (control element), UE assistance information, or the like.

Also, when the terminal apparatus 111 moves, the CC candidates set as described above can be expected to become inappropriate. Thus, upon the terminal apparatus 111 moving, the base station apparatus 101 may use an RRC message (for example, an RRC reconfiguration message) to instruct the terminal apparatus 111 to delete at least a part of the CC candidate information. For example, in a case where there has been a change in the primary cell of the terminal apparatus 111, the secondary CC candidate information may be deleted. Also, the base station apparatus 101 may add or delete secondary CC candidates on the basis of the measurement report of the wireless quality from the terminal apparatus 111. Also, for example, when CC candidate setting is performed for the terminal apparatus 111, an activation period for the setting may also be set. The setting may be deleted upon the activation period elapsing. The base station apparatus 101 may perform CC candidate setting at constant intervals or may update the setting information before the activation period elapses, for example. Also, for example, the base station apparatus 101 may update the CC candidate to be set on the basis of the measurement result for each CC in the terminal apparatus 111. In other words, upon a change in the measurement result in the terminal apparatus 111, the base station apparatus 101 may deduce which cell region the terminal apparatus 111 exists in and may set the CC of a nearby cell existing within a distance of a predetermined range from this cell as a candidate CC, for example. Also, the terminal apparatus 111 may measure the wireless quality for CCs (cells) not set as a candidate CC and may request the base station apparatus 101 to add a CC detected to have sufficient wireless quality as a candidate CC. The base station apparatus 101 may notify the terminal apparatus 111 of the setting information of this CC in response to this request.

Note that the selection of CCs to be activated from among the CC candidates set in the terminal apparatus 111 may be performed on the basis of a priority order set for each CC candidate, for example. The priority order may be set with the CCs having good wireless quality being set higher in the priority order, for example. Accordingly, CC candidates with high wireless quality can be preferentially activated. Here, for example, CC candidates with a wireless quality that is not equal to or greater than a threshold may be excluded from being assigned in the priority order. This can prevent CCs without sufficient wireless quality but that are high in the priority order due to all CC candidates having low wireless quality from being activated. Also, the wireless quality of each CC candidate may be compared with a wireless quality threshold set in advance, and CC candidates with a wireless quality that is greater than the threshold may be set high in the priority order. Note that the threshold may be the wireless quality of the currently in-use secondary CC, for example. In other words, CC candidates with a better wireless quality than the currently in-use CC may be set in the priority order in a manner making them likely to be activated.

Also, the priority order may be set on the basis of the load status of the cells corresponding to each CC candidate. In other words, the priority order of CC candidates corresponding to cells with a high load status can be decreased, and the priority order of CC candidates corresponding to cells with a low load status can be increased. Also, the priority order may be set on the basis of the type of service that can be provided (for example, the slice supported by each cell, whether or not a communication service can be provided to a terminal apparatus with reduced capability (reduced capability UE), and the like. For example, CCs that can provide a communication service executed by the terminal apparatus 111 and CCs that can support the capability information of the terminal apparatus 111 can be set high in the priority order and made more likely to be activated. Also, in a case where one or more of the CCs are powered off due to network power saving control, these CCs may be set low in the priority order to make them less likely to be activated. Note that processing to relatively increase or decrease the priority order may be performed by adding a predetermined offset value to the wireless quality of each CC in the case of increasing the priority order and by subtracting a predetermined offset value from the wireless quality of each CC in the case of decreasing the priority order. Note that the offset value corresponding to the priority order may have a plurality of levels so that the priority order may be assigned more appropriately. For example, multiple levels of offset values according to the magnitude of loads may be prepared, or multiple levels of offset values according to the duration of power off time may be prepared.

Also, as described above, in a case where CC candidates with a wireless quality that is not equal to or greater than a threshold are excluded from being assigned in the priority order, the threshold may be changed for each CC candidate using criteria such as described above. For example, for a CC candidate with a high load status, a predetermined offset value can be added to the threshold to make it less likely that the CC candidate is targeted for priority order assignment, that is, to make it less likely that the CC candidate is activated. In a similar manner, for a CC candidate with a low load status, a predetermined offset value can be subtracted from the threshold to make it more likely that the CC candidate is targeted for priority order assignment, that is, to make it more likely that the CC candidate is activated. Also, CCs that can provide a communication service executed by the terminal apparatus 111 and CCs that can support the capability information of the terminal apparatus 111 can be made more likely to be activated by subtracting the predetermined offset value to reduce the threshold. Also, in a case where one or more of the CCs are powered off due to network power saving control, the offset value may be added to the threshold to make these CCs less likely to be activated. The offset value used with the threshold may be a value with multiple levels.

The terminal apparatus 111 may activate a number of CCs that can be used in descending priority order on the basis of the priority order set as described above. Note that at this time, activation processing may be performed on the basis of a combination of frequency bands that the terminal apparatus 111 can use. For example, in the case of activating the one CC highest in the priority order, other CCs that cannot be used in combination with this CC may not be activated even if they are high in the priority order. Note that a priority order may be assigned for each combination of the frequency bands that the terminal apparatus 111 can use. For example, a priority order may be assigned on the basis of the throughput estimated to be obtained by using each combination. Also, as described above, the priority order may be adjusted depending on the load status, the service that can be provided, the power off state, or the like. Note that selecting the CCs to be activated or deactivated in this manner may be performed by the terminal apparatus 111, and the base station apparatus 101 may be notified of the selection result. For example, the terminal apparatus 111 may report the result of measuring the wireless quality to the base station apparatus 101, and the base station apparatus 101 may perform selection in a similar manner on the basis of this report.

The activation/deactivation of the CCs in the terminal apparatus 111 may be triggered by an increase or decrease in the amount of data transmitted and received by the terminal apparatus 111. Also, the activation/deactivation of the CCs in the terminal apparatus 111 may be performed in response to a predetermined event occurring, for example.

An event includes the wireless quality of a candidate CC not in use (deactivated CC) becoming better than the wireless quality of the in-use CC (activated CC). Note that in a case where a plurality of CCs are in use, an event may be determined to have occurred when the wireless quality of a CC candidate not in use becomes better than the wireless quality of the CC with the lowest quality from among the in-use CCs. Also, in a case where a plurality of CCs are in use, an event may be determined to have occurred when the wireless quality of a CC candidate not in use becomes better than the average value of the wireless quality of the in-use CCs. In such a case, the wireless quality used as evaluation criteria for the in-use CCs may be determined using different criteria. Accordingly, in a case where there is a CC candidate that is not in use but has a better wireless quality than the currently in-use CCs, by using this CC candidate (for example, by switching CCs), the terminal apparatus 111 can perform communication with good wireless quality.

Also, an event may be that the wireless quality of a CC candidate not in use has exceeded a predetermined threshold. In this case, by activating the CC candidate, the terminal apparatus 111 can perform communication with good wireless quality. Also, an event may be that the wireless quality of an in-use CC has dropped below a predetermined threshold. In a case where a plurality of CCs are in use, an event may be determined to have occurred when the quality of the CC with the lowest quality from among the CCs drops below a predetermined threshold. Also, in a case where a plurality of CCs are in use, an event may be determined to have occurred when the average value of the wireless quality of the CCs drops below a predetermined threshold. In such a case, the wireless quality used as evaluation criteria for the in-use CCs may be determined using different criteria. In this case, by stopping the use of the CCs and deactivating the CCs, the terminal apparatus 111 can be made to use a different CC with relatively good wireless quality.

Also, an event may be that the wireless quality of an in-use CC has dropped below a first threshold and the wireless quality of a CC candidate not in use has exceeded a second threshold. Also, an event may be that the wireless quality of a CC candidate not in use is better than the wireless quality of the in-use CC by a predetermined offset amount or more. Accordingly, the communication environment of the terminal apparatus 111 can be enhanced by activating a CC that is not activated but is expected to be able to communicate with better wireless quality than the in-use CC. Also, an event may be that the amount of data accumulated at a radio link control (RLC) buffer has exceeded a predetermined value. Accordingly, the number of CCs to be activated can be increased when a large amount of data is accumulated at the buffer.

Note that each event may be reported from the base station apparatus 101 to the terminal apparatus 111 via an RRC message (for example, an RRC reconfiguration message or an RRC resume message). Also, when an event occurs, the terminal apparatus 111 transmits the measurement result to the base station apparatus 101. Then, the base station apparatus 101 decides whether to activate CCs that are currently not in use or deactivate CCs that are currently in use and instructs the terminal apparatus 111 of the decision content. In this case, the base station apparatus 101 may decide the number of CCs to be activated on the basis of the amount of data accumulated at the RLC buffer or the like and decide to activate that number of CCs. Note that the base station apparatus 101 may exchange information indicating the CC congestion status, the corresponding service type, and whether power saving control such as power off is enabled or disabled with another base station apparatus providing the in-use CC or a CC candidate. Note that this information may be exchanged with a base station using a RESOURCE STATUS REQUEST or may be shared with a base station via a new message. Also, the base station apparatus 101 may decide the priority order for the in-use CCs and CC candidates on the basis of the obtained information and may decide the CCs to be activated/deactivated.

Note that when an event occurs, the terminal apparatus 111 may autonomously decide to activate CCs that are currently not in use or to deactivate CCs that are currently in use. In this case, the terminal apparatus 111 may decide the number of CCs to be activated depending on the amount of data accumulated at the RLC buffer or the like. The terminal apparatus 111 may notify the base station apparatus 101 of the CCs to be activated/deactivated and may store this information on the network side.

In this manner, in the present embodiment, setting of CC candidates for the terminal apparatus 111 is performed, CCs to actually use (activate) are selected from among the CC candidates, and the selected CCs are activated. Accordingly, the CCs to be used in the terminal apparatus 111 can be flexibly changed. Thus, in the terminal apparatus 111, CCs with good wireless quality can be used according to the situation, and the communication efficiency can be enhanced.

Note that in the example described above, a method for selecting CCs to be activated or deactivated from among set candidate CCs is described. However, in response to a predetermined event occurring, information of a secondary CC candidate may be added and deleted. The base station apparatus may instruct the terminal apparatus to measure the wireless quality of CCs not set as a secondary CC candidate, for example. In a case where the wireless quality of the CC not set as a secondary CC candidate exceeds a predetermined threshold, the terminal apparatus determines that an event has occurred and reports that an event has occurred to the base station apparatus. Then, the base station apparatus may set the CC as a new secondary CC candidate on the basis of this report. Also, in a case where the wireless quality of the CC set as a secondary CC candidate drops below a predetermined threshold, the terminal apparatus may determine that an event has occurred and may report that an event has occurred to the base station apparatus. In this case, the base station apparatus can delete the CC from the secondary CC candidates. Also, in a case where an event is determined to have occurred on the basis of the wireless quality of a CC not set as a secondary CC candidate exceeding the wireless quality of a CC set as a secondary CC candidate for a certain period of time, the secondary CC candidate may be switched.

Apparatus Configuration

An example of the hardware configuration of the base station apparatus (the base station apparatus 101 and the base station apparatus 102) and the terminal apparatus 111 will now be described using FIG. 4. The base station apparatus and the terminal apparatus include, for example, a processor 401, ROM 402, RAM 403, a storage apparatus 404, and a communication circuit 405. The processor 401 is a computer, such as a general-purpose central processing unit (CPU), an application specific integrated circuit (ASIC), or the like, including one or more processing circuits. By the processor 401 reading out and executing a program stored in the ROM 402 and the storage apparatus 404, the processing of the entire apparatus and the processing described above are executed. The ROM 402 is read-only memory that stores information, such as a program relating to processing executed by the base station apparatus and the terminal apparatus, various parameters, and the like. The RAM 403 is random-access memory that functions as a work space when the processor 401 executes a program and temporary stores information. The storage apparatus 404 is constituted by a detachable external storage device, for example. The communication circuit 405 is constituted by a circuit for LTE or 5G wireless communication, for example. Note that in FIG. 4, only the single communication circuit 405 is illustrated, but the base station apparatus and the terminal apparatus may include a plurality of communication circuits. For example, the base station apparatus and the terminal apparatus may include wireless communication circuit and a shared antenna for LTE and 5G. Note that the base station apparatus and the terminal apparatus may separately include an antenna for LTE and an antenna for 5G.

Figure 5:
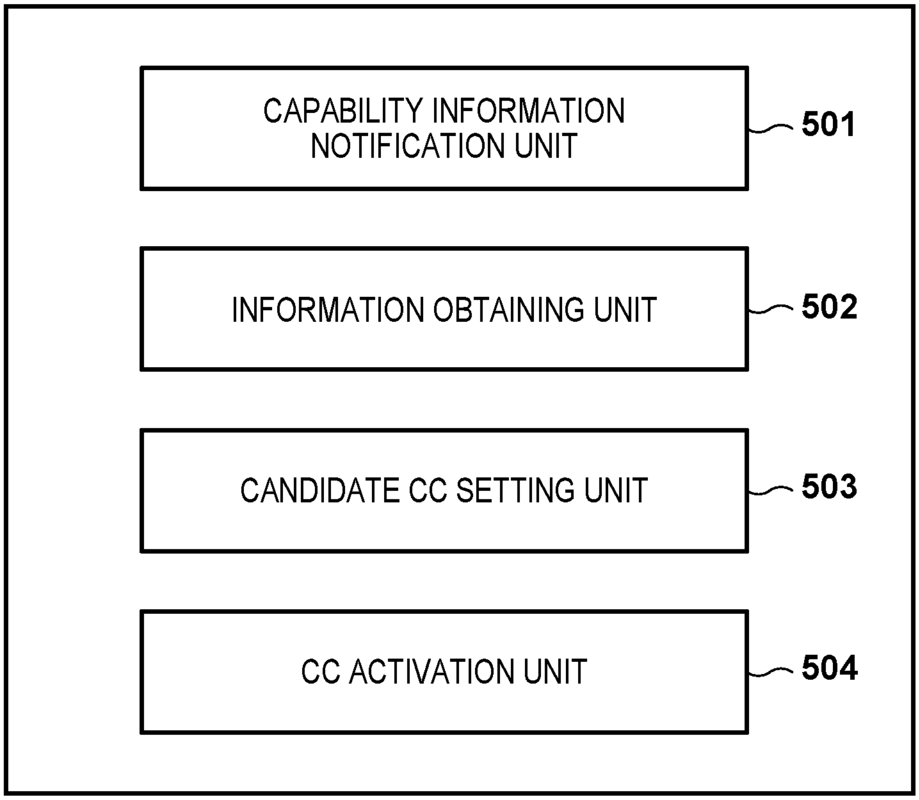
FIG. 5 is a diagram illustrating an example of the functional configuration of a terminal apparatus.

FIG. 5 is a diagram illustrating an example of the functional configuration of the terminal apparatus. The terminal apparatus includes a capability information notification unit 501, an information obtaining unit 502, a candidate CC setting unit 503, and a CC activation unit 504. These functional units may be implemented, for example, by the processor 401 executing a program stored in the ROM 402 or the storage apparatus 402. However, no such limitation is intended, and one or more or all of these functional units may be implemented using dedicated hardware, for example. Note that the processing executed by the terminal apparatus has been described above, and thus only a brief description of the functional configuration of the terminal apparatus will be given here.

The capability information notification unit 501 notifies the base station apparatus of the capability information (UE capability) of the terminal apparatus. Note that the capability information includes information indicating a combination of frequency bands that can be used in a case where the terminal apparatus communicates using a plurality of CCs of a plurality of frequency bands via DC or CA. The information obtaining unit 502 obtains setting information for using one or more CCs corresponding to the one or more frequency bands not restricted or bound by the combinations of usable frequency bands reported as described above. The candidate CC setting unit 503 performs setting of one or more CCs on the basis of the obtained setting information. In other words, for example, in a case where the terminal apparatus can use a combination of the band 1 and the band 41 and the combination of the band 1 and the band 42 but cannot use a combination of the band 41 and the band 42 and the CC of band 1 is the primary CC, the setting information of both the band 41 and the band 42 is obtained as the information of the secondary CC candidates and setting is performed to make the CC of these frequency bands usable. In other words, typically, only the information of the actual frequency band to be used is obtained to perform the setting. However, in the present embodiment, the setting information for frequency bands not actually used is obtained to perform setting. From among the CCs for which the candidate CC setting unit 503 has performed setting, the CC activation unit 504 activates the CCs to be actually used or deactivates the in-use CCs when making them not in use. The CC activation unit 504 selects the CCs to be activated on the basis of the combination of usable frequency bands as described above. In other words, for example, in a case where the terminal apparatus can use a combination of the band 1 and the band 41 and the combination of the band 1 and the band 42 but cannot use a combination of the band 41 and the band 42, processing is performed so that both the band 41 and the band 42 are not activated.

Note that the information obtaining unit 502 may further obtain information relating to the number of CCs to be activated. Note that the information of the number of CCs to be activated may indicate the maximum number allowed to be activated or may indicate the number of CCs to be actually activated. Also, the information obtaining unit 502 may obtain information indicating a combination of frequency bands that cannot be activated together (for example, temporarily prohibited) from the base station apparatus. Also, the information obtaining unit 502 may obtain information indicating a combination of frequency bands that can be activated together from the base station apparatus. Also, the CC activation unit 504 may decide CCs to be activated upon receiving an instruction from the base station apparatus or may autonomously select CCs to be activated and, after activation, may notify the base station apparatus of information indicating which CCs have been activated. Also, in a case where the primary CC has been changed, an instruction has been received from the base station apparatus, or the like, the candidate CC setting unit 503 may delete the set information. Also, in a case where each piece of setting information includes an activation period, the candidate CC setting unit 503 may delete the setting information upon the activation period elapsing. Also, with the terminal apparatus, in a case where a CC (cell) not set as a candidate CC is detected, the information obtaining unit 502 may request the base station apparatus to add the CC as a candidate CC and may receive the setting information of the CC from the base station apparatus.

Figure 6:
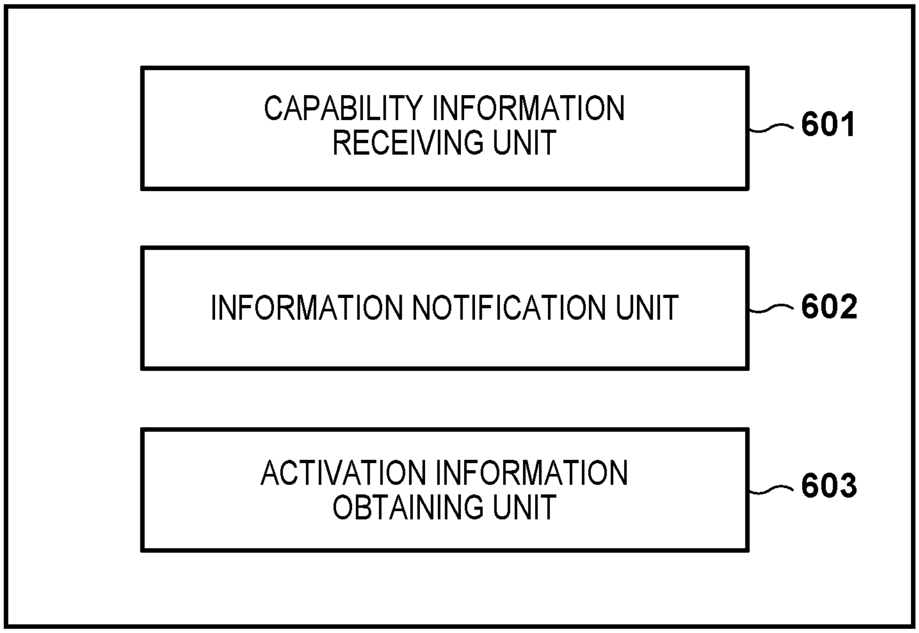
FIG. 6 is a diagram illustrating an example of the functional configuration of a base station apparatus.

FIG. 6 is a diagram illustrating an example of the functional configuration of the base station apparatus. The base station apparatus, for example, includes a capability information receiving unit 601, an information notification unit 602, and an activation information obtaining unit 603. These functional units may be implemented, for example, by the processor 401 executing a program stored in the ROM 402 or the storage apparatus 402. However, no such limitation is intended, and one or more or all of these functional units may be implemented using dedicated hardware, for example. Note that the processing executed by the base station apparatus has been described above, and thus only a brief description of the functional configuration of the base station apparatus will be given here.

The capability information receiving unit 601 receives capability information (UE capability) of the terminal apparatus as described above from the terminal apparatus. The information notification unit 602 notifies the terminal apparatus of setting information for using one or more CCs corresponding to the one or more frequency bands not restricted or bound by the combinations of frequency bands usable by the terminal apparatus received from the terminal apparatus. Note that the information notification unit 602 transmits a request to add a secondary cell to another base station apparatus expected to provide communication using the one or more CCs and obtains information such as the communication parameter to be used by the cell, for example. Then, the information notification unit 602 may notify the terminal apparatus to the setting information including the communication parameter information. Note that the setting information may include activation period information. The activation information obtaining unit 603 obtains information indicating which CCs from among the set candidate CCs have been activated in the terminal apparatus. Note that the activation information obtaining unit 603, for example, may obtain the information indicating which CCs to be activated by internally generating this information. The activation information obtaining unit 603 may designate CCs to be activated by the terminal apparatus by notifying the terminal apparatus of the generated information. Also, in a case where the terminal apparatus autonomously decides the CC to be activated, the activation information obtaining unit 603 may receive information indicating the activated CC from the terminal apparatus.

Note that the information notification unit 602 may further report information relating to the number of CCs to be activated. Note that the information of the number of CCs to be activated may indicate the maximum number allowed to be activated or may indicate the number of CCs to be actually activated. Also, the information notification unit 602 may notify the terminal apparatus of information indicating a combination of frequency bands that cannot be activated together (for example, temporarily prohibited). Also, the information notification unit 602 may notify the terminal apparatus of information indicating a combination of frequency bands that can be activated together. Also, in a case where a request is received from the terminal apparatus to add a CC (cell) not set as a candidate CC detected in the terminal apparatus as a candidate CC, the information notification unit 602 may notify the terminal apparatus of the setting information relating to the CC.

Processing Flow

Figure 7:
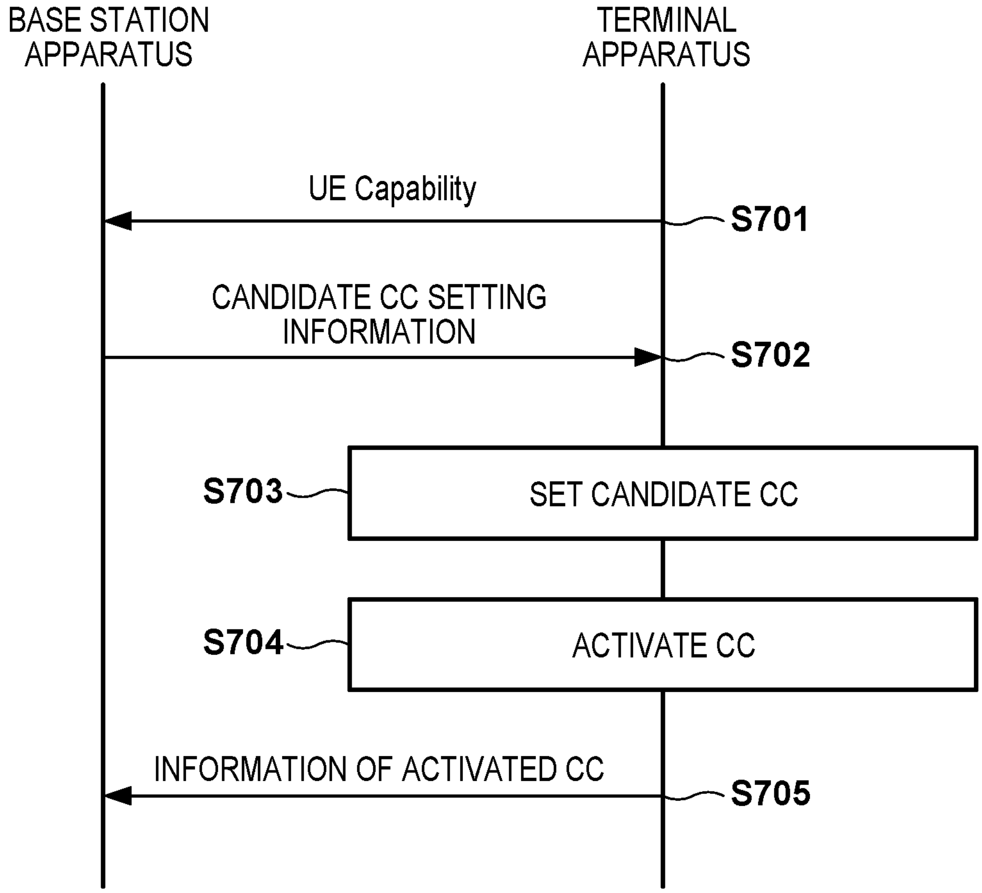
FIG. 7 is a diagram illustrating an example of the flow of the processing executed by the wireless communication system.
Figure 8:
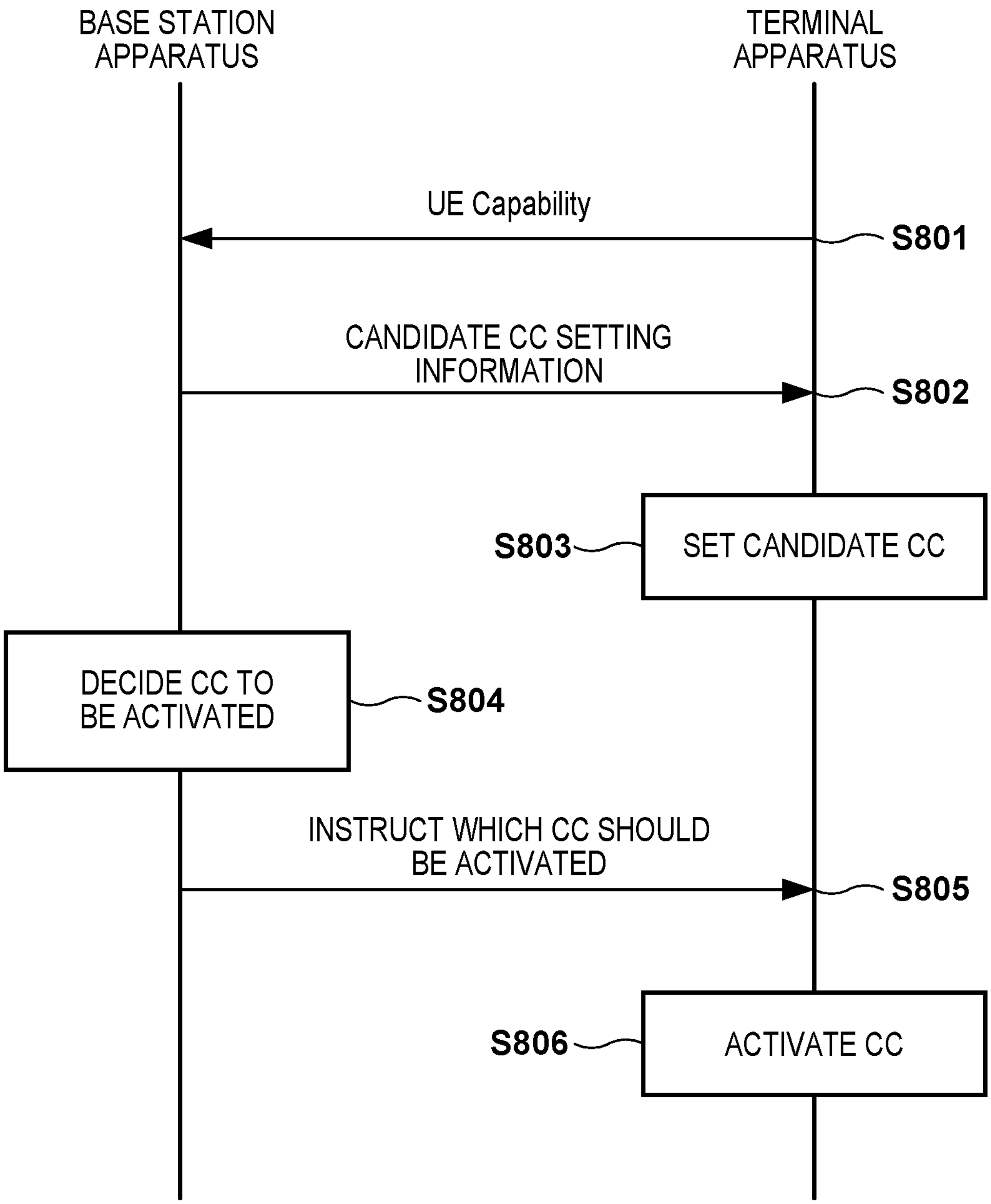
FIG. 8 is a diagram illustrating an example of the flow of the processing executed by the wireless communication system.

Next, an example of the flow of the processing executed by the wireless communication system will be described. Note that variations of the processing executed by the base station apparatus and the terminal apparatus have been described above. Thus, here, only an outline of the main processing executed with the base station apparatus and the terminal apparatus will be given, and redundant details will not be given. FIG. 7 illustrates an example of the flow of the processing executed when the terminal apparatus autonomously decides CCs to use and activates them. FIG. 8 illustrates an example of the flow of the processing executed when the base station apparatus decides CCs to be used in the terminal apparatus and transmits an instruction to the terminal apparatus.

In FIGS. 7 and 8, the terminal apparatus notifies the base station apparatus of the capability information (UE capability) including information of a combination of frequency bands that the terminal apparatus can use and the like (S701, S801). Note that the base station apparatus may performing CC setting for CA or DC using a known method on the basis of the capability information. In the present embodiment, CCs that can be used with CA or DC are set for the terminal apparatus without restriction by the information of a combination of frequency bands that the terminal apparatus can simultaneously use indicated by the capability information, to ensure flexible CC operation (S702, S802). For example, the base station apparatus transmits, to the terminal apparatus, setting information for using the CC for all of the frequency bands that the terminal apparatus can use (without taking into consideration the combinations). The setting may be performed in a similar manner to a known CC setting, but setting is performed so that CCs are not used unless activated. The terminal apparatus performs pre-setting of CCs as candidates to be used on the basis of the information from the base station apparatus (S703, S803).

As illustrated in FIG. 7, the terminal apparatus independently selects CCs to be activated and activates the selected CCs (S704). Then, the terminal apparatus notifies the base station apparatus of information indicating which CCs have been activated (S705).

As illustrated in FIG. 8, the base station apparatus decides the CCs for the terminal apparatus to activate (S804) and transmits an instruction to activate these CCs to the terminal apparatus (S805). Then, the terminal apparatus activates the CC candidates designated by the instruction as CCs to be used (S806). Note that deciding the CCs to be activated and transmitting an instruction to activate the CCs may be performed at a timing such as when the instruction is transmitted in S802, for example. In other words, in S802, the information of the CCs corresponding to candidates may be transmitted to the terminal apparatus together with the information indicating the CCs to be activated at that time. In this case, for example, in response to a change in the wireless environment of the terminal apparatus, a wireless quality measurement report may be transmitted from the terminal apparatus to the base station apparatus, and the base station apparatus may decide the CCs to be activated and the CCs to be deactivated and notify the terminal apparatus to the decision result.

Note that the processing of FIG. 7 and the processing of FIG. 8 may be combined. In other words, depending on the situation, either the processing of FIG. 7 or the processing of FIG. 8 may be selectively executed.

Note that in the example in FIG. 8, the base station apparatus providing the primary CC performs the determination to activate/deactivate the candidate CCs for the terminal apparatus. However, for example, in the case of DC, the base station apparatus providing the secondary CCs may perform the determination. In other words, the determination described above may be performed by either the base station apparatus providing the primary CCs or the base station apparatus providing the secondary CCs. For example, the wireless quality measurement result in the terminal apparatus is reported to the base station apparatus providing the primary CC, and the base station apparatus decides the CCs to be activated on the basis of the wireless quality. Then, the base station apparatus notifies other base station apparatuses providing CCs to be activated of the decision result. This notification, for example, may be performed using an S-NODE MODIFICATION REQUEST or an RRC TRANSFER. Also, for example, a new Xn message may be defined, and the notification may be performed using this message. The other base station apparatuses that receive the notification acknowledge the notification. Note that the other base station apparatuses may reject connection with the terminal apparatus. For example, the other base station apparatuses may use an S-NODE MODIFICATION REQUEST ACKNOWLEDGE or an RRC TRANSFER to notify the base station apparatus of the rejection decision, or may notify the base station apparatus of the decision using a newly defined Xn message. In this case, the base station apparatus can make the CCs that have been rejected CCs to not be activated. Then, the base station apparatus can amalgamate the results and transmit an instruction designating the CCs to be activated to the terminal apparatus. Note that in a case where all of the secondary CCs cannot be activated, the base station apparatus can also instruct the terminal apparatus to continue measurement.

Also, in a case where the base station apparatus providing the secondary CCs is connected to the terminal apparatus via SRB3 (signaling radio bearer 3), the measurement result of each secondary CC candidate can be received from the terminal apparatus. The base station apparatus providing the secondary CCs can select the CCs to be activated on the basis of the measurement result in a similar manner to the determination by the base station apparatus providing the primary CC described above. Also, the base station apparatus providing the secondary CCs, in a similar manner to the method executed by the base station apparatus providing the primary CC, may transmit a message to the other base station apparatuses providing the candidate CCs and perform processing to exclude those that are rejected from being activation targets. Then, the base station apparatus providing the secondary CCs confirms the CCs to be activated, the base station apparatus transmits the information indicating the CCs directly to the terminal apparatus, for example. Also, a first base station apparatus providing the secondary CCs may provide this information to a second base station apparatus providing the primary CC and cause the information to be transmitted from the second base station apparatus to the terminal apparatus.

As described above, in the present embodiment, CC candidate setting is performed in the terminal apparatus, CCs to be actually used (activated) are selected from among the CC candidates, and the selected CCs are activated. Accordingly, the CCs to be used in the terminal apparatus can be flexibly changed. Thus, in the terminal apparatus, CCs with good wireless quality can be used according to the situation, and the communication efficiency can be enhanced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A terminal apparatus comprising:

one or more processors; and one or more memories that store a computer-readable instruction for causing, when executed by the one or more processors, the one or more processors to function as:

a notifying unit configured to notify a base station apparatus of information indicating a combination of frequency bands usable by the terminal apparatus in a case of communicating using a plurality of component carriers with different frequency bands;

an obtaining unit configured to obtain, from the base station apparatus, information of a setting for using one or more component carriers corresponding to one or more frequency bands unrestricted by the combination of usable frequency bands;

a setting unit configured to set the one or more component carriers on a basis of the obtained information of a setting; and an activating unit configured to activate a component carrier included in the set one or more component carriers on a basis of the combination of usable frequency bands, wherein the activating unit activates a component carrier included in the set one or more component carriers without an instruction from the base station apparatus, and notifies the base station apparatus of information indicating whether any component carrier has been activated by the activating unit.

2. The terminal apparatus according to claim 1, wherein the obtaining unit further obtains information relating to the number of component carriers to be activated from the base station apparatus.

3. The terminal apparatus according to claim 1, wherein the obtaining unit further obtains, from the base station apparatus, information instructing a combination of component carriers that cannot be activated together.

4. The terminal apparatus according to claim 1, wherein the obtaining unit further obtains, from the base station apparatus, information instructing a combination of component carriers that can be activated together.

5. The terminal apparatus according to claim 1, wherein the obtaining unit obtains, from the base station apparatus, an index for identifying a combination of component carriers to be activated.

6. The terminal apparatus according to claim 5, wherein the obtaining unit obtains an index for indicating a combination of component carriers to be activated via an Radio Resource Control, RRC, message, Downlink Control Information, DCI, or a system information block, and obtains an instruction for activating the obtained combination of component carriers via a Medium Access Control-Control Element, MAC CE.

7. The terminal apparatus according to claim 6, wherein the obtaining unit obtains, from the base station apparatus, an instruction for deleting information regarding the activated component carriers.

8. The terminal apparatus according to claim 1, wherein a primary component carrier is set for the terminal apparatus and the base station apparatus, and the one or more component carriers correspond to a secondary component carrier candidate.

9. The terminal apparatus according to claim 1, wherein a primary component carrier is set for the terminal apparatus and the base station apparatus, the one or more component carriers correspond to a secondary component carrier candidate, and the setting unit deletes a setting of the one or more component carrier in a case where the primary component carrier is changed.

10. The terminal apparatus according to claim 1, wherein a setting of the one or more component carriers includes an activation period.

11. The terminal apparatus according to claim 1, wherein a setting of the one or more component carriers includes an activation period, and the setting unit deletes a setting with an elapsed activation period.

12. The terminal apparatus according to claim 1, wherein in a case where a component carrier not included in the one or more component carriers is detected, the obtaining unit requests the base station apparatus to add the component carrier as the one or more component carriers.

13. A control method executed by a terminal apparatus comprising:

notifying a base station apparatus of information indicating a combination of frequency bands usable by the terminal apparatus in a case of communicating using a plurality of component carriers with different frequency bands;

obtaining, from the base station apparatus, information of a setting for using one or more component carriers corresponding to one or more frequency bands unrestricted by the combination of usable frequency bands;

setting the one or more component carriers on a basis of the obtained information of the setting;

activating a component carrier included in the set one or more component carriers on a basis of the combination of usable frequency bands, wherein the activating is performed without an instruction from the base station apparatus; and notifying the base station apparatus of information indicating whether any component carrier has been activated.

14. A terminal apparatus comprising:

one or more processors; and one or more memories that store a computer-readable instruction for causing, when executed by the one or more processors, the one or more processors to function as:

a notifying unit configured to notify a base station apparatus of information indicating a combination of frequency bands usable by the terminal apparatus in a case of communicating using a plurality of component carriers with different frequency bands;

an obtaining unit configured to obtain, from the base station apparatus, information of a setting for using one or more component carriers corresponding to one or more frequency bands unrestricted by the combination of usable frequency bands;

a setting unit configured to set the one or more component carriers on a basis of the obtained information of a setting; and an activating unit configured to activate a component carrier included in the set one or more component carriers on a basis of the combination of usable frequency bands, wherein a setting of the one or more component carriers includes an activation period, and the setting unit deletes a setting with an elapsed activation period.

* * * * *